May 1, 1956  R. BECKADOLPH ET AL  2,743,760
METHOD AND APPARATUS FOR BUILDING TIRE CASINGS
Filed March 5, 1953  2 Sheets-Sheet 1
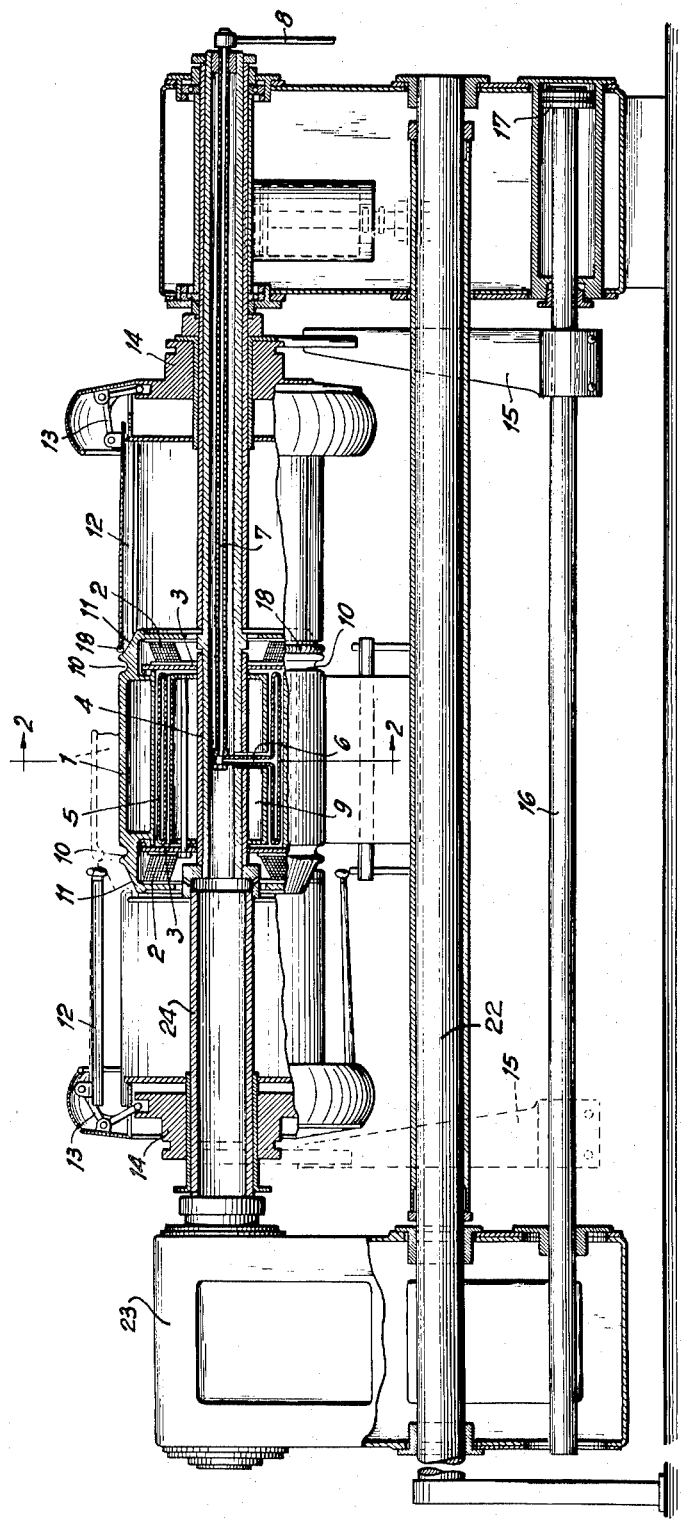
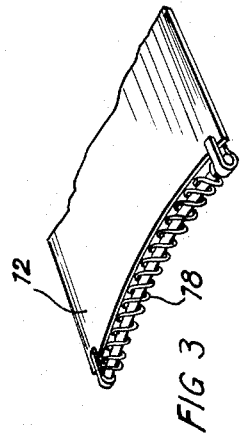
FIG. 3
FIG. 1
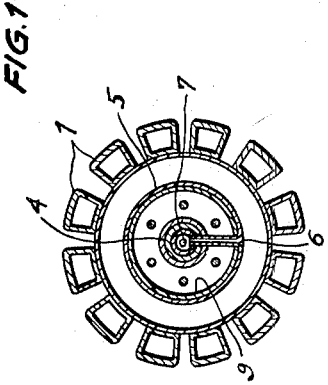
FIG. 2
INVENTORS
RICHARD BECKADOLPH
WALTER NICLAS
BY Toulmin & Toulmin
ATTORNEYS

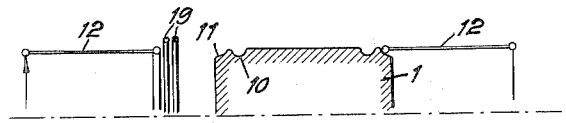
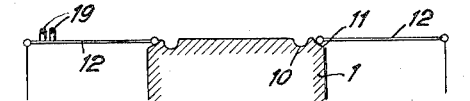
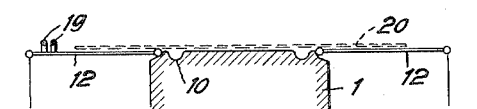
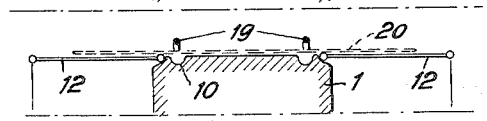
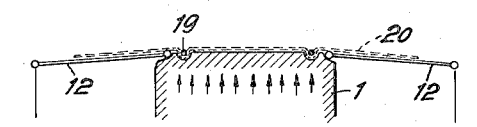
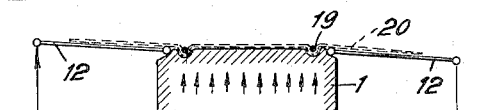
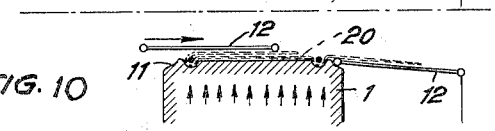
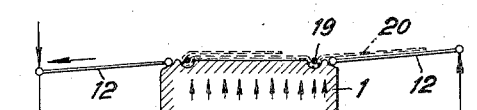
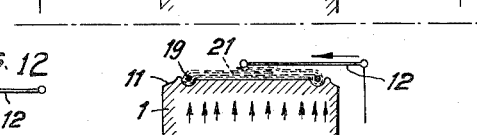
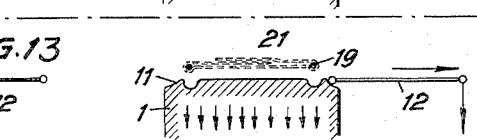

# United States Patent Office 2,743,760
Patented May 1, 1956

2,743,760

METHOD AND APPARATUS FOR BUILDING TIRE CASINGS

Richard Beckadolph and Walter Niclas, Hannover, Germany, assignors to Firma Continental Gummi-Werke, A.-G., Hannover, Germany Application March 5, 1953, Serial No. 340,544

9 Claims. (Cl. 154—9)

This invention relates to a method and apparatus for construction casings for pneumatic tires, particularly to such a method and apparatus for the construction of the fabric portion of the tires, together with the beads, and prior to the placing of the tread on the casing.

Pneumatic vehicle tires are generally constructed by superposing a plurality of layers of textile or metal reinforced fabric impregnated with rubber so as to form an integral unit when the tire is built. Such material often takes the form of threads, cords, or cables laid parallel and held together by a rubber or rubber-like binder or matrix.

The casing of the tire is generally assembled on a winding drum, which may be subdivided and collapsed for permitting the casing to be removed therefrom. Such winding drums are well known and have as one characteristic a fixed diameter that cannot be changed during the building of the tire, but only collapsed in order to release the casing from the drum.

As is well known, in connection with such drums, it is absolutely necessary for the drums to be rotated during the building up of the tire casing because the entire construction of the casing depends on the rolling together of the elements of the casing during the building thereof.

An important object of the present invention is the provision of a method and apparatus for building tire casings and including a drum in which the rotation of the drum is of subordinate importance.

An apparatus is also known for the preparation of pneumatic tire casings where rubber covered or rubber impregnated layers of cloth are placed upon a drum and the marginal edges of these layers turned back on the cloth over the bead cores by the use of axially movable side drums. In this arrangement, as in the conventional arrangement referred to above, the winding drum is fixed in diameter, and this introduces as a difficulty the impossibility of prefabricating the bead cores, and these cores may, rather, be built up from individual wires or cables during the manufacture of the casing. This, of course, makes the procedure of constructing the casing time consuming and laborious.

A further object of this invention is the provision of a method and apparatus for constructing tire casings which permits the use of prefabricated cores for the beads of the casing.

A still further object of this invention is the provision of a method and apparatus for the manufacture of tire casings which is simple, rapid, and results in an improved product.

The objects referred to above, and still other objects and advantages of this invention, are attained by utilizing a drum which is variable in diameter. Thus, during the construction of the tire casing, the diameter of the drum may be changed repeatedly, and in any position of adjustment of the drum the circumference thereof is in the form of a cylindrical surface.

According to this invention the drum is adjusted to a smaller diameter at the beginning of the building operation and thereafter a ribbon of rubber covered or rubber impregnated cloth is passed about the drum. Thereafter, prefabricated bead cores are placed over the drum and positioned thereon a predetermined distance from each other. The drum diameter is then enlarged, and this causes the bead cores and the ribbon of cloth to tighten on the drum.

The extending marginal edges of the ribbon of cloth that project outwardly beyond the bead cores are then turned backwardly about the bead cores and over the central part of the ribbon of cloth.

Thereafter, the diameter of the drum is again decreased and the crude tire casing is removed therefrom. The further steps in the manufacture of the finished tire casing, which steps are substantially conventional, may now follow, namely, the shaping of the crude casing into a hollow ring, the application thereto of the tread and side wall rubber and the subsequent vulcanizing of the tire casing in a tire mold.

The method of constructing a tire casing, according to the present invention, is extremely rapid and a substantial saving in cost is realized through the practice of this invention, as well as the elimination of extremely high skills on the part of the machine operators.

The several objects and advantages referred to above will become more apparent upon reference to the accompanying drawings, in which:

Figure 1 is a longitudinal sectional view taken through an apparatus, according to my invention;

Figure 2 is a transverse sectional view indicated by line 2—2 on Figure 1, and showing the drum of the machine in cross-section to illustrate the segments thereof;

Figure 3 is a fragmentary perspective view showing the spring edge forming a part of the side drums of the machine; and Figures 4 through 13 are diagrammatic views illustrating the several procedural steps in the construction of a crude tire casing, according to this invention.

Referring to the drawings somewhat more in detail, the machine, according to the present invention, comprises a tire building drum 1 consisting of a plurality of segments which, when taken together, define a cylindrical outer surface for the drum. The segments are guided and supported by rubber-metal springs 2 and end plates 3 on the center axle 4 of the drum in such a way that the segments can be moved radially of the axle. The springs 2 bias the segments of the drum inwardly so that they tend to decrease the diameter of the drum. It will be understood, of course, that this particular type of spring is not essential to this invention, and that other spring arrangements and guiding means for the segments could be employed.

Radially inwardly of the segments of the tire building drum 1 is the annular expansible element 5 which is connected by fitting 6 and pipe 7 to a conduit 8 leading to a source of fluid pressure, such as air or oil. Inwardly of expansible element 5 a cylinder 9 is provided that is carried by axle 4, and it will be apparent that inflation of element 5 by fluid pressure will force segments 1 radially outwardly while maintaining the cylindrical configuration of the expansible drum.

Adjacent their ends, the segments forming the drum 1 are provided with grooves 10 for receiving the bead cores of the casing. Toward the ends of the segments beyond grooves 10, the said segments have inclined surfaces 11 so that the drum, consisting of a plurality of segments, has conical ends.

According to the present invention there are axially movable hollow auxiliary drums at the opposite ends of the construction drum, and these take the form of the sheet metal drums consisting of the individual segments 12. These sheet metal segments 12 are individually sprung inwardly toward the axis of the tire building drum and are adapted for being moved outwardly by having their outer ends connected with one end of a bell crank lever 13, the other end of which engages the annular grooves in slidable member 14. Member 14 is adapted for axial movement, and in this manner the axially movable drums can be expanded and contracted.

One of the axially movable drums is arranged on the center axle 4 while the other axially movable drum is mounted on the supporting tube 24 which rests in an axially displaceable tail stock 23. This tail stock is displaceably arranged on the main supporting tube 24 and the axial drum thereon is displaceable, by means not shown but commonly known in the art, away from the tire building drum 1. The amount of axial displacement is equal to the distance between the spaced grooves 10 on the tire building drum 1. When displacing the tail stock 23 and the supporting tube 24 and the auxiliary drum thereon out of contact with the tire building drum 1 toward its end position on the supporting rod 22, the supporting tube 24 is disengaged from the free end of the center axle 4 and the left end of the tire building drum is exposed. Thereby it is made possible to introduce the tire fabric 20 and the prefabricated bead cores 19 and bring them onto the tire building drum. The same step of displacement of the tail stock 23 and the supporting tube 24 and the auxiliary drum thereon is carried out when the built-up tire casing is to be removed from the tire building drum 1.

The axial movement of the said drums is accomplished by the arms 15 that are connected with the members 14, and which arms are rigid with a rod 16 that carries a piston 17 within a hydraulic cylinder. It will be apparent from the foregoing that leftward movement of cylinder 17 from its Figure 1 position will result in expansion of the axially movable drum at the right-hand end of the machine and contraction of the axially movable drum at the left end of the machine with simultaneous axial movement thereof. Similarly, the opposite direction of movement of piston 17 would result in the opposite action of the axially movable drums.

The ends of segments 12 of the axially movable drums adjacent the tire building drum are rounded so that they will slide easily along the fabric to be worked thereby and will not catch on the fabric which might result in the tearing thereof. Advantageously, the said ends of segments 12, indicated at 18, may be provided with helical springs which may be in the form of an individual spring for each of the segments 12, or a single continuous spring extending completely around the axially movable drum. These springs are preferably supported so that they will roll on their axes and this will facilitate the operation of the axially movable drums.

Referring now to Figures 4 through 13, the various steps in the method of constructing a tire casing, according to the present invention, are illustrated.

In Figure 4 the drum is in a collapsed position and the bead cores 19 can be introduced to one side of the tire building drum and then placed over the adjacent of the axially movable drums to be in position for subsequently being brought over the tire building drum and into registration with grooves 10 thereof.

In Figure 5 of the drums the left-hand axially movable drum has been brought back into position relative to the tire building drum, and the tire building drum is now ready to receive the ribbon of rubber impregnated cloth which is placed thereon as indicated at 20 in Figure 6. This ribbon may consist of a single layer of cloth, or may, preferably, consist of a two-layer ribbon with the cords running diagonally. It might be noted at this point that the cloth being referred to generally consists of parallel threads or cords held together by a rubber matrix. Such materials are conventional in the tire building art and are familiar to all skilled in the art.

After the layer or layers of cloth 20 have been placed about the tire building drum as referred to in Figure 6, the prefabricated bead cores 19 are then moved in as illustrated in Figure 7 until they register with the grooves 10 at the ends of the tire building drum. The construction drum is then expanded by inflation of element 5 and assumes the position illustrated in Figure 8. The cloth and the bead cores are now drawn tightly about the drum.

By a supply of pressure fluid to one side of piston 17, the axially movable drum at the left side of the tire building drum is now moved in, as illustrated in Figures 9 and 10, with the ends of the drum adjacent the tire building drum first taking a radial movement and then an axial movement so as to fold the peripheral edge of cloth layer 20 inwardly of its Figure 10 position.

Piston 17 is then operated in the opposite direction, and this will result in the retraction of left-hand axially movable drum and the inward movement of the right-hand axially movable drum as illustrated in Figures 11 and 12.

Thereafter, the right-hand axially movable drum is retracted and then the diameter of the tire building drum can be reduced and the casing 21 removed therefrom. It is possible, of course, to add further layers of cloth, cord or tread to the casing, or even to apply the tread rubber to the casing before it is removed from the tire building drum if so desired.

In any case, the advantages of an extremely rapid work cycle obtain, one that does not require a skilled workman, and an improved result is had.

It will be understood that modifications could be made in the end structure, as, for example, the use of an expansible tire building drum arrived at by an inflatable periphery and the inflatable element 5 could be replaced by axially movable conical cam members, and the expansion of the segmented tire building drum accomplished in that manner.

It will be understood that this invention is susceptible to modification in order to adapt it to different usages and conditions, and, accordingly, it is desired to comprehend such modifications within this invention as may fall within the scope of the appended claims.

We claim:

1. An apparatus for use in the building of tire casings comprising a segmented tire building drum, annular means adjacent the ends of said drum for receiving the portion of fabric underlying the bead cores and said cores; means for increasing the diameter of said main drum; axially movable and radially expansible segmented auxiliary drums at opposite ends of said main tire building drum and mounted coaxially therewith; means for expanding the diameter of said auxiliary drums beyond the maximum diameter of said main drum; means for reducing the diameter of said auxiliary drums, when expanded, to that of said main drum; means for telescoping at least one at a time of said auxiliary drums being expanded to a diameter beyond the maximum diameter of said main drum over said main drum; means for withdrawing said auxiliary drums from said main drum; and means for reducing the diameter of said main drum, when expanded, to its initial size.

2. An apparatus for use in the building of tire casings comprising a generally cylindrical segmented main tire building drum, an annular depression adjacent each end of said drum for receiving the portion of tire fabric underlying the bead cores and said cores, said drum being provided with inwardly tapered ends outwardly of said annular depressions, means for altering the diameter of said main drum, said means comprising spring means acting on the segments of said tire building drum urging them radially in one direction and fluid operable means contained within said drum for urging said segments in the opposite direction, axially movable and radially expansible hollow auxiliary drums coaxially arranged on opposite sides of said tire building drum, said auxiliary drums consisting of a plurality of segments having their ends adjacent the tire building drum continuously spring-urged toward said tapered ends of said building drum, means for expanding the diameter of said auxiliary drums beyond the maximum diameter of said tire building drum; means for reducing the diameter of said auxiliary drums to that of said tire building drum, means for telescoping said auxiliary drums having their diameter increased beyond the maximum diameter of said main drum over said drum to fold back the marginal portions of the tire fabric over the bead cores and the central portion of said tire fabric on said drum, and withdrawing said auxiliary drums from said main drum.

3. In an apparatus for manufacturing pneumatic tire casings, a first and second spaced end frame member, a first shaft carried by said first frame member and projecting toward said second member, a segmented, expansible main tire building drum mounted on the end of said first shaft between said frame members, means for altering the radial diameter of said main drum, a second shaft extending from said second frame member into telescopic engagement with the end of said first shaft between said frame members whereby said second frame member and second shaft can be moved axially to expose the end of said main tire building drum; and expansible hollow auxiliary drums of substantially cylindrical shape reciprocably mounted on each of said shafts at each end of said main drum, said auxiliary drums, when expanded, being adapted for telescoping over the ends of said main drum for folding back the marginal edges of a tire fabric wrapped about said main drum during the building of a tire casing thereon, said main drum having its end portions tapered, the ends of the segments of said auxiliary drums adjacent said main drum being spring-urged toward said tapered end portions of the latter whereby said auxiliary drums, when moved toward said main drum, are first expanded radially outwardly and then moved axially of said main drum while closely embracing the same.

4. In an apparatus as described in claim 3, the arrangement of said first shaft being hollow; and said means for altering the radial diameter of said main drum extending through said first hollow shaft.

5. In an apparatus for manufacturing pneumatic tire casings, a first and a second spaced end frame member, a hollow shaft carried by said first frame member and projecting toward said second member, a main tire construction drum mounted on the end of said first shaft between said frame members, means extending through said hollow shaft for expanding said main drum, a second shaft extending from said second frame member into telescopic engagement with the free end of said hollow shaft whereby said second frame member and second shaft can be moved axially to expose the end of said main construction drum facing said second frame member and substantially cylindrical side drums reciprocably mounted on each of said shafts and adapted for being telescoped over the ends of said main construction drum for folding back marginal edges of a cloth ribbon wrapped about said main construction drum during the construction of a tire casing thereon, said main construction drum having its end portions tapered inwardly; the ends of the segments of said auxiliary drums adjacent said main drum being spring-urged toward said tapered end portions of said main drum whereby said auxiliary drums, when moved toward the said main drum, are first expanded radially outwardly and then moved axially of said main drum while closely embracing the same.

6. The method of building a pneumatic tire casing in a tire building apparatus comprising wrapping a tire fabric with its central portion around a main tire building drum and its marginal portions around auxiliary drums coaxially arranged on opposite ends of said main tire building drum, placing prefabricated bead cores about said main tire building drum on said tire fabric adjacent the ends of said main tire building drum, expanding the main tire building drum radially into tight engagement with said fabric and cores, expanding one of said auxiliary drums radially beyond the radial diameter of the tire building drum, axially telescoping one of said expanded auxiliary drums over said main tire building drum, thereby folding one marginal portion of said fabric over the core adjacent said expanded auxiliary drum and over the central portion of said fabric, withdrawing said expanded auxiliary drum and expanding the other auxiliary drum, axially telescoping said other expanded auxiliary drum over said tire building drum, thereby folding the other marginal portion of said tire fabric over the second core adjacent said other auxiliary drum and over the central portion of said tire fabric on said tire building drum, withdrawing said other expanded auxiliary drum and removing the completely built tire from the tire building drum.

7. The method of building a pneumatic tire casing in a building apparatus comprising wrapping a tire fabric with its central portion around a main tire building drum and its marginal portions being each of less than half the width of said central portion around auxiliary drums coaxially arranged on opposite ends of said main tire building drum, spacing prefabricated bead cores about said main tire building drum on said tire fabric adjacent each end of said main tire building drums, expanding said main tire building drum radially into tight engagement with said fabric and cores, expanding the auxiliary drums radially beyond the radial diameter of the tire building drum, axially telescoping said expanded auxiliary drums over said tire building drum, thereby folding the marginal portions of said fabric over the cores adjacent said expanded auxiliary drums and over the central portion of said fabric, withdrawing said expanded auxiliary drums and removing the completely built tire from the tire building drum.

8. An arrangement according to claim 2 in which the ends of the said segments of the side drums adjacent the construction drum are rounded.

9. An arrangement according to claim 2 in which the said segment ends of the side drums are rounded and comprise helical coil elements rotatably carried by the said segments.

References Cited in the file of this patent

UNITED STATES PATENTS

| | | |
|---|---|---|
| 1,954,764 | Anderson | Apr. 10, 1934 |
| 2,039,531 | Heston | May 5, 1936 |
| 2,084,009 | Sohl | June 15, 1937 |
| 2,182,176 | Maranville | Dec. 5, 1939 |
| 2,339,543 | Bishop | Jan. 18, 1944 |
| 2,565,071 | Frazier | Aug. 21, 1951 |
| 2,614,951 | Iredell | Oct. 21, 1952 |
| 2,715,932 | Frazier | Aug. 23, 1955 |
| 2,715,933 | Frazier | Aug. 23, 1955 |